Nov. 9, 1965 E. S. BABLER 3,216,729

RECORD CHANGER SPINDLE

Filed July 16, 1962 2 Sheets-Sheet 1

INVENTOR
EGON S. BABLER
BY James J. Hamill
ATTORNEY

Nov. 9, 1965

E. S. BABLER 3,216,729

RECORD CHANGER SPINDLE

Filed July 16, 1962

2 Sheets-Sheet 2

INVENTOR
EGON S. BABLER
BY James J. Hamill
ATTORNEY 3,216,729
RECORD CHANGER SPINDLE
Egon Stephan Babler, 4253 W. Cullom, Chicago, Ill.
Filed July 16, 1962, Ser. No. 210,619
17 Claims. (Cl. 274—10)

The present invention relates to record changers for phonographs and the like, wherein records of various sizes are supported above a turntable of a record player by a vertical spindle. More specifically this invention relates to a novel record supporting means incorporated within a spindle upon which the records are stacked and released one at a time to the turntable.

An object of the invention is to provide a new and improved record holding spindle having inexpensive and relatively few components.

An object of the invention is to provide a straight record spindle for supporting a stack of records from which the lowermost record can be dropped straight downwardly and for permitting removal of a record from the spindle after it has been played by lifting the record vertically along the spindle.

An object of the invention is to provide record supporting levers that are of identical construction and which not only serve to support the lowermost record of a stack when a record is playing but which also hold any record thereabove from falling during the dropping of the lowermost record to a turntable.

An object of the invention is to pivotally retain identical record supporting levers which are loosely arranged within the record spindle and to permit movement of the supporting levers to three positions; namely, a first position for supporting the bottommost record, a second position for holding the record next thereabove while dropping the lowermost record, and a third position permitting the removal of these records from the spindle after they have dropped to the turntable.

An object of the invention is to retain identical record supporting levers within a record spindle by a retaining ring and to move said record supporting levers from and between various positions by means of an operating shaft.

An object of the invention is to retain identical record supporting levers within the confines of a record spindle by a retaining ring which holds the identical record supporting levers against an operating shaft and which ring serves to act as a stripper to move said identical levers to within said record spindle when the operating shaft moves the recording support levers from a record supporting position.

An object of the invention is to lift the records above the lowermost record of a stack of records and thereby remove any downward force that would be exerted by the stack of records on the lowermost record whereby the lowermost record falls under the influence of its weight only.

An object of the invention is to provide a record supporting spindle that is of tubular one piece construction.

An object of the invention is to detect the size of the record being played at an intermediate position between the stack of records and the turntable.

An object of the invention is to detect the dropping of the last record onto the turntable by detecting an extra travel of the operating shaft due to the absence of records being held from dropping while a record is being released.

These and other more specific objects become more apparent when considered in conjunction with the detailed description of the record changing spindle and operating means built in accordance with the drawings wherein.

Figures 1, 2, 11:
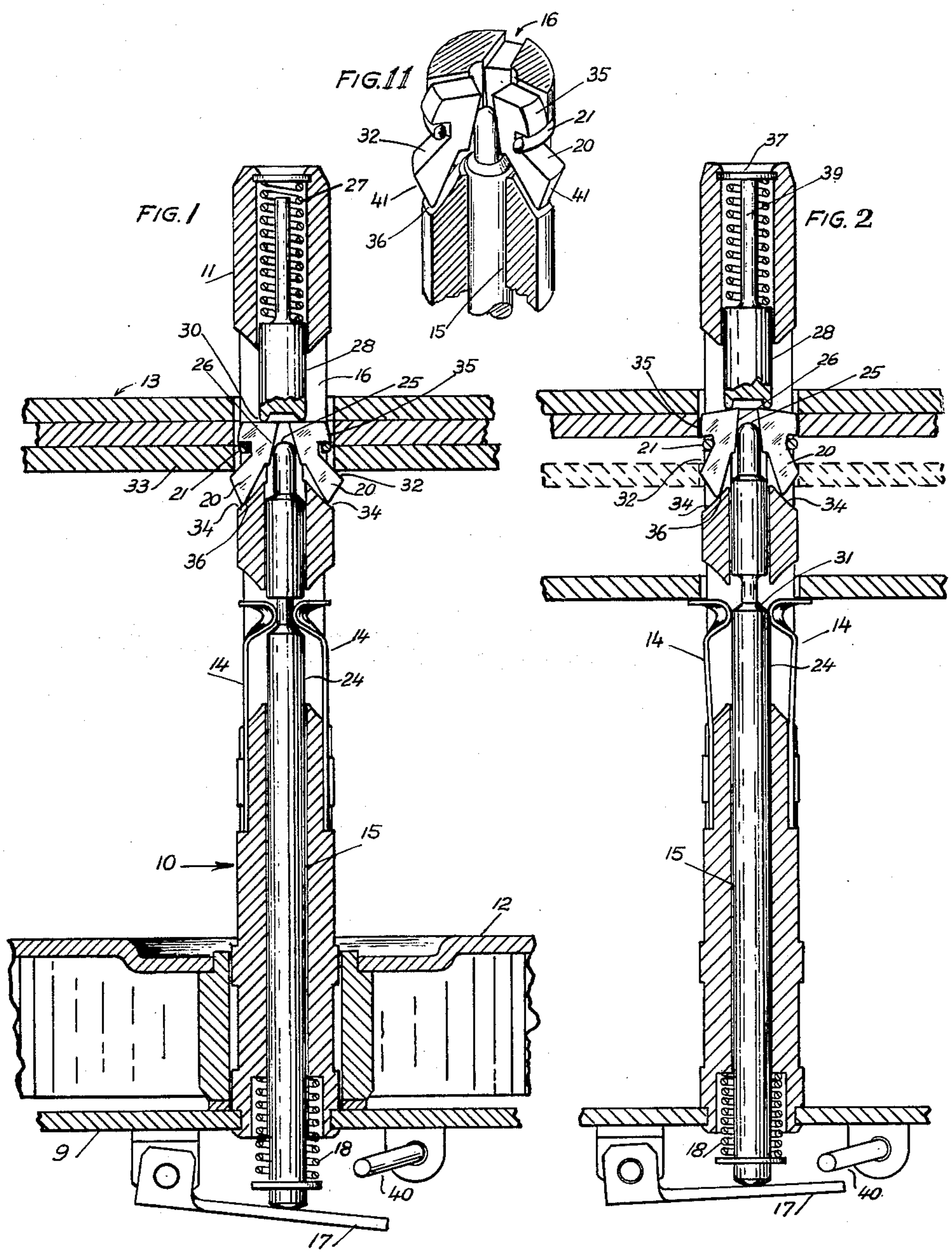
FIG. 1 is a vertical section view of the supporting spindle of a record changer having a stack of records positioned on said supporting means in normal position.
FIG. 2 is a vertical section of the supporting spindle of a record changer showing the release of the lowermost record from the bottom of the stack of records and the holding of the records above the lowermost record.
FIG. 11 is an enlarged cross sectional view of the spindle with three supporting levers.

Referring now to the drawings, there is shown in FIG. 1 a record changer 10 having a vertical upstanding spindle 11 attached to a record player base 9 supporting a turntable 12 upon which the records rest while playing. A stack of records is held above the turntable 12 and records therefrom are consecutively released from this spaced position for downward movement to the face of the turntable 12. As shown in FIG. 2 a released record is halted in its downward movement intermediate the stack of records and the turntable by spring support levers 14 while a sensing arm (not shown) moves inwardly to contact the edge of the released record and to gauge the size of the record. The sensing arm controls the proper positioning of a playing arm (not shown) which then can be properly set for that size of record. After being gauged, the record is released for further downward movement to the turntable 12.

The record spindle 11 is a vertical tubular shaft of one-piece construction having a hollow interior 15 and a plurality of longitudinally milled slots 16 spaced equidistantly about the circumference of the spindle 11. Within each of the longitudinal slots 16 is a record supporting lever 20 having a thickness equal to approximately the width of each of the longitudinal slots 16. The record supporting levers 20 are held within these slots by a metal retaining ring 21 supported in a groove 22 in the outer wall of the record spindle 11. Slidably carried within the hollow interior 15 of the spindle 11 is a vertically oriented operating rod 24 having a rounded camming surface 25 at its upper extremity for engaging an inclined camming surface 26 on each of the record supporting levers 20. The camming surface 25 of the operating rod 24 bears against the inclined surface 26 of the record supporting levers 20 holding them against radial inwardly movement in all of their positions as shown in the drawings. A downward force is applied to the record supporting levers 20 by a compression spring 27 carried in the upper interior of the shaft 11, the compression spring 27 biases a vertically slidable plug 28 which has a downwardly extending lip 30 for engaging and exerting a downward force on the upper surface of each of the record supporting levers 20. The lip 30 of plug 28, the camming surface 25 on the operating rod 24, and the retaining ring 21 each engage and exert a force on the record supporting levers 20 to position and retain them within their longitudinal slots in each of their record supporting, recording holding, and record releasing positions, as will be brought out hereinafter.

Figure 3:
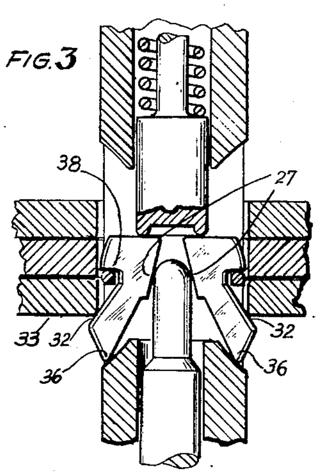
FIG. 3 is an enlarged fragmentary view showing the record supporting lever in its record stack supporting position.

When the operating rod 24 is in its lowermost position and the spring pressed plug 28 is in its lower position, as shown in FIGS. 1 and 3 of the drawings, each of the record supporting levers 20 is also in its downward position and has its lower record supporting surface 32 extending outwardly of the wall of the spindle 11 for engagement with a lower edge of the lowermost record 33 of the stack of records 13. The weight of the stack of records causes a force to be exerted against the inclined lower record supporting surfaces 32 on the record supporting levers 20. This force tends to pivot the recording supporting surfaces 32 of the record supporting levers 20 inwardly and spherical record holding surfaces 35 outwardly about the retaining ring 21. However, the record supporting levers 20 have points 36 that engage the inclined surface 34 forming the lower wall of the longitudinal slots 16 and prevent rotation of the record supporting surfaces 32 inwardly about the retainer ring 21. As shown in FIG. 3, each of the recording supporting levers 20 is held in this record supporting position at the three spaced points of contact 27, 36 and 38 and hence, each record supporting lever 20 constitutes a three point support for holding the stack of records. This position is hereinafter designated as the recording supporting position.

The record supporting surfaces 32 of the levers 20 are configured to and constitute conical surfaces from a hypothetical cone generated about the center of the spindle. The conical configurations of the record supporting surfaces 32 are important from a centering standpoint since they will center a record that is tilted or off center when placed on these conical surfaces. Thus, the stack of records is held centered about the spindle by these conical surfaces, an advantage not afforded by nonconical record supporting surfaces.

An actuating arm 17 has been provided for moving the operating rod 24 upwardly against the downward bias of a spring 18 after a record has finished playing. When the operating rod 24 moves upwardly from the position shown in FIG. 1 to the position shown in FIG. 2, the record supporting levers 20 concomitantly begin to pivot and to move upwardly as the points 36 of the levers 20 engage the inclined surfaces 34 and follow the surfaces 34 thus controlling the amount of pivoting of the levers 20 as the levers 20 move upwardly.

Figure 4:
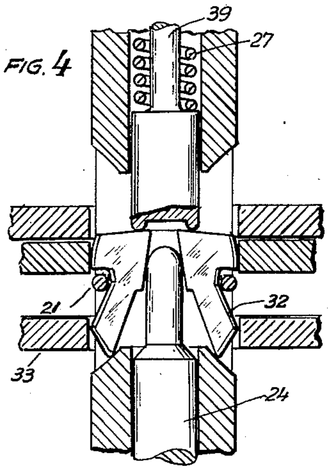
FIG. 4 is an enlarged sectional view of the supporting spindle showing the supporting lever engaging the second lowermost record and releasing the lowermost record.

As the record supporting levers 20 move upwardly from the positions shown in FIGS. 1 and 3 to those positions shown in FIGS. 2 and 4, they pivot about the retaining ring 21 and their spherical record holding surfaces 35 move outwardly of the confines of the spindle and into engagement with the wall of the aperture of the second lowermost record. Because the weight of the records acts upon the record supporting surface 32 when holding a stack of records and because the point 36 of the lever 20 also engages the upwardly curved surface 34, the weight of the records applies a horizontal component of force to the record supporting levers 20 tending to pivot the trip levers 20 about the retaining ring 21 thereby facilitating the rotation of the trip levers 20 when the operating rod 24 moves upwardly. Thus, the force required to raise the operating rod 24 is greatly reduced by this construction and the need for oversized motors to lift operating rods, as was the case with prior art operating rods, has been eliminated.

The spherical record holding surface 35 of the levers 20 has a curvature identical to that of the interior walls of apertures of the records to prevent the marring or chipping of the interior holes when a horizontal thrust is being applied to hold the second lowermost record.

The inclined surface 34 causes the levers 20 to lift the record stack a small amount that is sufficient to separate the lowermost record 33 from that record next above as the operating rod 24 moves upwardly. Because the stack of records above the lowermost record 33 is moved upwardly from engagement with the lowermost record 33, the stack of records does not exert any downward force on the lowermost record 33 at the time when the record 33 is released by the record supporting levers 20.

The lowermost record 33 drops to an intermediate position where is it caught by a record support 14. The record supports 14 are cammed outwardly by cams 31 on operating rod 24 as it moves upwardly. A record sizing arm (not shown) is moved inwardly to sense the size of the record to prepare the record pickup for appropriate radial positions for an intermixed stack. As the operating rod 24 moves downwardly, cams 31 are no longer effective to press outwardly the record supports 14 and the record supports 14 return to within the confines of the spindle 11. The record is now released to turntable for playing.

Gravity and the urging of the spring urged plug 28 cause the record supporting levers 20 to follow the cam surface 25 of the operating rod 24 in the downwardly direction, and due to the curvature of the lower walls 34 of the longitudinal slots 16, the record supporting surfaces 32 of levers 20 pivot outwardly and about the retaining ring 21, and the inclined surfaces 32 of the record supporting levers 20 are in position to catch the downwardly dropping stack of records 13 as shown in FIG. 1.

Figure 5:
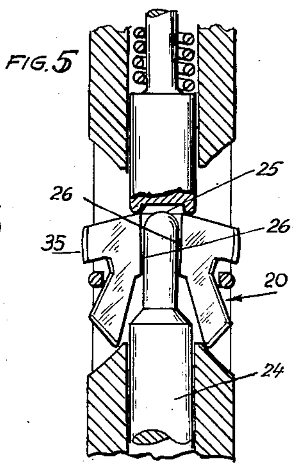
FIG. 5 is an enlarged vertical section view of the supporting spindle showing the operating rod over traveling after the last record is dropped onto the turntable.
Figure 6:
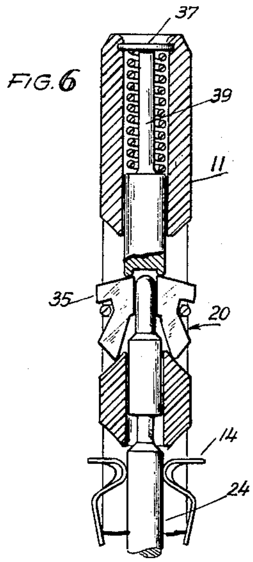
FIG. 6 is a sectional view of the vertical record supporting spindle showing the operating shaft in its over traveled position due to the absence of any records to be held for playing.

When the last record of the stack is released to drop to the spring support means 14 (FIGS. 5 and 6), the operating shaft 24 and levers 20 over travel as they move upwardly after releasing the last record for playing. That is, since there is no record to be engaged and be held by the spherical record supporting surface 35, the camming surface 25 is able to pivot the record holding surfaces 35 of levers 20 further outwardly of the spindle 11 and the operating rod 24 can move farther upward, as shown in FIG. 6. During the over travel of the operating lever 24 due to the absence of a record on a spindle, acutuating arm 17 engages and actuates a microswitch lever 40 positioned on the base 9 of the record changer 10. The microswitch lever 40 is so spaced from the actuating arm 17 that the arm 17 cannot actuate the lever 40 unless the operating rod 24 travels to its fullest extent. An elongated pin 39 on the slidable plug 28 engages a top cover plate 37 (FIGS. 2 and 6) during the over travel of operating rod 24 and thereby limits the amount of over travel. Thus, without the provision of any extra means the playing of the last record of a stack of records is detected and provision can be made to shut off the machine automatically following the playing of the last record.

One of the salient features of the present device is the ease with which the stack of records may be removed from the spindle 11 without the detaching of the spindle 12 from the turntable and without any further actuation or operations of the elements by any external means. That is, the lifting of the stack of records brings the topmost record into engagement with an inclined surface 41 (FIG. 11) on the record supporting levers 20 and further upward movement of the records moves the record supporting levers 20 upwardly and inwardly against the urging of the downwardly biased plug 28. The record supporting levers 20 offer little resistance to being moved to within the interior of the spindle 11 as the records are being removed from the spindle. After removal of the stack of records, the spring urged plug 28 will, of course, return the levers downwardly to their record supporting positions. The spindle is thus in position and awaiting the next stack of records.

Figure 10:
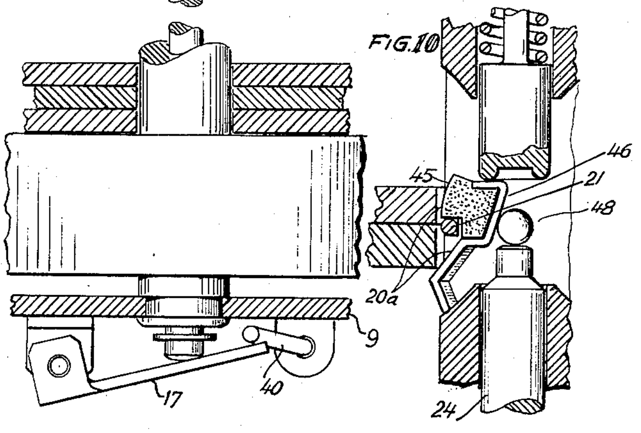
FIG. 10 is an enlarged fragmentary view of a two-piece record supporting lever according to another embodiment of the invention.

The record supporting levers 20 shown in FIGS. 1–9, inclusive, are of one-piece plastic construction of a type that can be readily molded in large quantities. While the single piece molded construction is preferred for the record supporting levers 20, another embodiment shown in FIG. 10 illustrates a two-piece record supporting lever 20A which is constituted by a rubber holding portion 45 and a support lever 46. As should be apparent from FIG. 10, the support lever 46 is configured to encircle the rearward portion of the holding portion 45 to make the record supporting lever 20A function as a single unit in the same manner as those record supporting levers 20 shown in FIGS. 1–8, inclusive. The principal advantage derived from the two-piece construction shown in FIG. 10 is that a different material such as rubber or other more resilient plastics can be used for the holding portion 45 that engages the interior wall of the aperture of the record to prevent any injuring of the record aperture when a large lateral holding force is applied to the wall in the record aperture.

In the embodiment shown in FIG. 10 a ball 48 rests on the upper end of the operating rod 24 and serves as the camming means to cause the record supporting levers 20A to move upwardly and to pivot about the retaining ring 21. The three record supporting levers 20A and the operating rod 24 prevent the ball 48 from escaping. The loose ball 48 has the advantage of being able to center between the record supporting levers 20A and apply equal forces to these levers even though the operating rod 24 is not exactly centered with respect to the record supporting levers 20A. Since the ball can rotate as it engages and moves the levers 20A, there is less friction therebetween than would be present with a fixed camming surface such as the camming surface 25 employed in the embodiment shown in FIGS. 1–6. Of course, a ball 48 could be substituted for the camming surface 25 shown in FIGS. 1–6.

Figure 7:
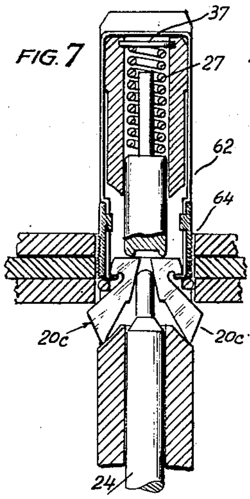
FIGS. 7 and 8 are fragmental sections of a spindle showing another embodiment of the invention wherein a U-shaped leafspring engages and holds the interior walls of a plurality of records during a record changing operation.
Figures 8, 9:
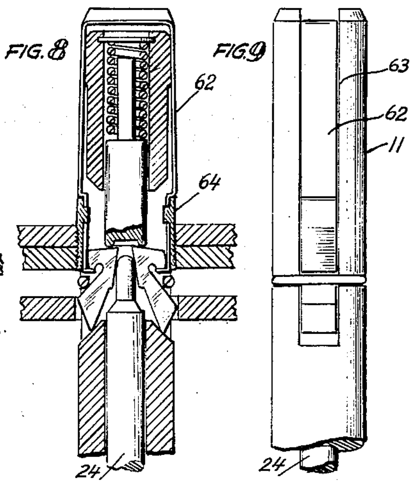
FIG. 9 is an elevational view of the leafsprings and spindle according to one embodiment of the invention.

In the embodiment shown in FIGS. 7, 8 and 9 an operating rod 24 is provided for actuating the record supporting levers 20C that are loosely arranged, i.e., floating, within the interior of the circumference of a shaft or spindle 11. However, rather than having spherical surfaces on the record supporting levers for directly engaging the wall of an aperture in a record, the record supporting levers 20C engage a flexible, longitudinal leafspring 62. The longitudinal leafspring 62 is preferably of one-piece construction and of a U-shaped configuration and is disposed within a notch 63 provided in the outer wall of the spindle shaft 11. Since the leafsprings 62 are biased inwardly, they tend to remain within the notch 63 in the spindle 11 and hence do not interfere with the placing of records on the spindle or the removal of records from the spindle so long as they are not cammed outwardly by their respective record supporting levers 20C. The principal advantage gained from employing longitudinal leafsprings 62 for engaging the interior wall of an aperture of a record is that the leafspring affords a greater vertical holding area than the small spherical record holding surfaces 35 of the record supporting levers 20 which engage only the interior wall of the aperture in the second lowermost record. That is, upon outward movement of the leafsprings 62, they engage the walls of a plurality of records including the second lowermost record. Hence, the amount of force applied to this second lowermost record to hold all of the records thereabove can be reduced since some of the records thereabove are also being held by the leafsprings 62. The leafsprings 62 are shown in FIGS. 7, 8 and 9 with a bonded rubber friction surface 64 thereon and they alternatively could have serrated or knurled surfaces on their lower end portions with which to grip a record.

Although particular embodiments of the invention are shown in the drawings and described in the foregoing specification, it will be understood that the invention is not limited to the particular embodiments described, but is capable of modification and rearrangement and substitution of parts and elements without departing from the spirit of the invention.

What is claimed is:

1. In an automatic record changer having a turntable for playing records, a straight tube magazine spindle having a plurality of longitudinal slots in said tube, a plurality of record changing levers, each of said record changing levers positioned within a slot and being movable between an operative record supporting position for supporting the lowermost record of a stack of records to a holding position for holding the record thereabove and the remaining records against downward movement while permitting said lowermost record to descend along the straight spindle to the turntable, each of said record changing levers having a holding surface for moving into position to engage the interior hole of the record above the lowermost record, a retaining ring means for holding said record changing levers within the interior of the magazine spindle, a cam surface on each of said record changing levers to pivot said changing levers about said retaining ring means, an operating rod slidably disposed inside said record spindle, said operating rod having a camming surface for engagement with the cam surfaces on said changing levers, said operating rod and said ring retaining means holding said record changing levers within the interior of said shaft while allowing said record changing levers to both pivot and to move vertically, movement of said operating rod in one direction camming said record changing levers to retract said record supporting surfaces from under the lowermost record whereby said record is released, and to radially move said record holding surfaces into holding engagement with the center hole of the record above the lowermost record.

2. The record changer of claim 1 wherein said camming surfaces on said record changing levers are disposed and inclined with respect to said camming surface on said operating rod and wherein said operating rod moves vertically upward to lift said changing levers and the record held thereby sufficiently to separate this record and the stack of records from the lowermost record whereby the force due to the weight of records above the lowermost record is removed from the lowermost record as it is being released.

3. In an automatic record changer having a turntable for records, a vertical hollow central guiding and supporting spindle for a stack of records, said magazine spindle having a plurality of slots in said tubes, a plurality of record changing levers of generally identical shape supported within each of said slots in said spindle, each of said record changing levers having a holding surface for movement into engagement with the hollow center hole of a record to hold said record against downward movement, each of said record changing levers having a record supporting surface for supporting the lowermost record of a stack of records and the stack of records, a pivot supporting means for record changing levers about which said record changing levers pivot, a cam surface on said changing levers, and an operating rod means having a camming surface for engaging the came surface on said changing levers to move said changing levers both longitudinally and pivotally about the pivot supporting means, movement of said operating rod means in one direction camming said record changing levers to retract said record supporting surfaces from under the lowermost record whereby said record is released, and to radially move said record holding surfaces into holding engagement with the center hole of the record above the lowermost record.

4. The record changer of claim 3 including a switch means controlling operation of the record changer and actuated during the release of the last record of the stack of records, said switch means disposed adjacent to said operating rod means for actuation only during the over travel of said operating rod means due to the absence of a record to be engaged by said holding surfaces on said record changing levers.

5. The record changer of claim 4 including a stop means for limiting the upward travel of said operating rod means during its over travel.

6. In a phonograph record changer, a vertical hollow central guiding and supporting tube having a plurality of slots in said tube, each of said slots terminating in a guiding surface, a plurality of record changing levers disposed in said slots, each of said record changing levers having a support point in engagement with the guiding surface on said slots, a lower record supporting surface on said record changing lever to support said lowermost record and thereby said stack of records against downward movement, a pivot and retaining means for said plurality of said record changing levers, said record changing levers capable of pivotable movement about said retaining and pivot supporting means and also capable of vertical movement within the confines of the interior of said hollow tube, an upper holding surface on said record changing levers, an operating rod inside the hollow tube and normally engaging said record changing levers to hold said levers in their record supporting position and for moving said record changing levers about the pivot and retaining means to move radially said upper holding surfaces against the center hole in the record above the lowermost record and to move the record changing levers upwardly whereby the support points of the record changing levers engaging the guiding surfaces move upwardly and inwardly along said guiding surface in the slot in said tube, whereby the record supporting surfaces move from under the lowermost record to release said lowermost record for downward movement and the record holding surfaces move radially outward into holding engagement with the center hole of the record above the lowermost record.

7. In the record changer of claim 6 intermediate flexible record support means carried by said tube and operable by said operating rod during its movement in one direction to move outwardly into the downward path of a released record and to support said record during a record sizing operation, said flexible record support means operable during movement of said operating rod in the other direction to release said record for further downward movement.

8. In an automatic record changer having a turntable for records, a hollow straight magagine spindle of one-piece construction, said magazine spindle having a plurality of longitudinal slots therein with upwardly concave shaped surfaces, a plurality of record changing means, each of said record changing means of identical configuration and each supported within one of said longitudinal slots, each of said record changing means having an inclined surface for projecting outwardly of the periphery of the magazine spindle to engage the lowermost record and support the lowermost record and all records thereabove, a retaining ring encircling said record changing means to retain them within said record spindle confines, a biasing means normally urging said record changing means into position to present the inclined surfaces outwardly of the spindle into record supporting positions, each of said record changing levers having an upper holding surface for engaging the center hole in a record above said lowermost record, an operating means inside said hollow tube for moving said record changing means upwardly against said biasing means and to move that portion of said record changing lever engaging said guiding surface along said guiding surface and to pivot said upper holding surface into engagement with the center hole of the record above said lowermost record thereby holding the stack of records while said lowermost record is being released.

9. The record changer of claim 7 wherein said record changing means have an inclined surface for engagement with said retaining ring as said record changing means are moved upwardly by said operating means, movement of said inclined surface against said retaining ring forcing said record supporting inclined surfaces of said record means to within the confines of the magazine spindle whereby said lowermost record is released.

10. In a record changer having a turntable for playing records, a straight tube magazine spindle having a plurality of longitudinal slots in said tube, each of said slots having a lower guiding wall, a plurality of record changing levers, each of said record changing levers disposed within a longitudinal slot, retaining ring means encircling said slots in said spindle and retaining said record changing levers within said slots, an operating rod means disposed within said spindle for vertical movement to cause a record changing operation, camming means movable by said operating rod and engageable with said record changing levers, biasing means urging said record changing levers for engagement with said retaining ring and said camming means inclined record supporting surfaces on said record changing levers engaging the walls of the center hole of the lowermost record to support it and all records thereabove while said inclined record supporting surfaces extend outwardly of the confines of the record spindle, holding surfaces on said record changing levers movable from within the confines of the record spindle to outwardly of the confines of the record spindle and into engagement with the center hole of the record next above the lowermost record to hold the records above the lowermost record, inclined surfaces on said record changing levers for engagement with said retaining ring means, and guiding means on said record changing levers engaging said guiding walls of said slots whereby upon movement in one direction of said camming means by said operating means said camming means forces said record changing means upwardly bringing said inclined surface into engagement with said retaining means thereby causing said holding means on said record changing levers to move outwardly of the confines of the spindle into holding engagement with the record next above the lowermost record and thereby moving said record supporting surface within the confines of the record spindle as said guiding means follow said guiding surfaces whereupon said lowermost record is released for downward movement.

11. In a record changer having a turntable for playing records, a straight tube magazine spindle having a plurality of longitudinal slots in said tube, each of said slots having a lower guiding wall, a plurality of record changing levers, each of said record changing levers disposed within a longitudinal slot, retaining ring means encircling said slots in said spindle and retaining said record changing levers within said slots, an operating rod means disposed within said spindle for vertical movement to cause a record changing operation, camming means movable by said operating rod and engageable with said record changing levers, biasing means urging said record changing levers for engagement with said retaining ring and said camming means, inclined record supporting surfaces on said record changing surfaces on said record changing levers engaging the walls of the center hole of the lowermost record to support it and all records thereabove while said inclined record supporting surfaces extend outwardly of the confines of the record spindle, holding surfaces on said record changing levers movable from within the confines of the record spindle to outwardly of the confines of the record spindle and into engagement with the center hole of the record next above the lowermost record to hold the records above the lowermost record, inclined surfaces on said record changing levers for engagement with said retaining ring means, and reverse surfaces on said record changing levers projecting outwardly of said spindle while said record changing levers are in a record supporting position, said reverse surfaces engageable by the wall of the center hole of a record being removed from the spindle and movable by said record changing levers upwardly and interiorly of the confines of the spindle against the bias of said biasing means and thereby carrying said record supporting and holding surfaces interiorly of said spindle to permit said record to be removed from said spindle.

12. In a record changer wherein a plurality of records are supported and are released for downward movement to a turntable for playing, the improvement comprising a vertical record spindle extending vertically upward from said turntable, said record spindle having a plurality of slots therein, a plurality of record changing levers, a record changing lever disposed in each of said slots, a supporting surface on each of said changing levers for engaging and supporting the lowermost record of a stack of records, a resilient holding means on said record changing levers for engaging and holding the record next above said lowermost record while said lowermost record is being released, a retaining means confining said record changing levers within their respective slots, and an operating rod disposed within the record spindle for actuating said record changing levers to move said record supporting surfaces interiorly of the record spindle's outer surface thereby releasing the lowermost record and to move said holding surface outwardly of the record spindle's outer surface and into engagement with the record next above said lowermost record thereby holding the stack of records from moving downwardly as the lowermost record is being released.

13. In a record changer wherein a plurality of records are supported and are released for downward movement to a turntable for playing, the improvement comprising a vertical record spindle extending vertically upward from said turntable, said record spindle having a plurality of slots therein, a plurality of record changing levers, a record changing lever disposed in each of said slots, a supporting surface on each of said changing levers for engaging and supporting the lowermost record of a stack of records, flexible means on said spindle flexible outwardly into holding engagement with the interior wall of the apertures of a plurality of records above the lowermost record to hold the records engaged by said flexible means and thereby the records above these engaged records while the lowermost record is being released, means on said record changing levers movable to flex said flexible means into holding engagement with said records, a retaining means confining said record changing levers within their respective slots, and an operating rod means disposed within said spindle for actuating said record changing levers to move said record supporting surfaces interiorly of the record spindle's outer surface thereby releasing the lowermost record and to move said means on said record changing levers to flex said flexible means into engagement with the walls of the apertures in said plurality of records above said lowermost record thereby holding the stack of records from moving downwardly as the lowermost record is being released.

14. In an automatic record changer having a turntable for playing a stack of records, a straight tube magazine spindle having a plurality of longitudinal slots in said tube, a plurality of record changing levers, each of said record changing levers positioned within a slot and being movable between an operative record supporting position for supporting the lowermost record of a stack of records to a holding position for holding the record thereabove and the remaining records against downward movement while permitting said lowermost record to descend along the straight spindle to the turntable, each of said record changing levers having a rigid body and a holding surface for moving into position to engage the interior hole of the record above the lowermost record, a retaining ring means for holding said record changing levers within the interior of the magazine spindle, a cam surface on each of said record changing levers to pivot said changing levers about said retaining ring means, an operating rod slidably disposed inside said record spindle, said operating rod having a camming surface for engagement with the cam surfaces on said changing levers, said operating rod and said ring retaining means holding said record changing levers within the interior of said shaft while allowing said record changing levers to retract said record supporting surfaces from under the lowermost record whereby said record is released, and to radially move said record holding surfaces into holding engagement with the center hole of the record above the lowermost record.

15. In an automatic record changer having a turntable for playing records, a straight tube magazine spindle having a plurality of longitudinal slots in said tube, a plurality of record changing levers, each of said record changing levers positioned within a slot and being movable between an operative record supporting position for supporting the lowermost record of a stack of records to a holding position for holding the record thereabove and the remaining records against downward movement while permitting said lowermost record to descend along the straight spindle to the turntable, each of said record changing levers having a holding surface for moving into position to engage the interior hole of the record above the lowermost record, a retaining ring means disposed in a cavity on the outer peripheral surface of said spindle and confining said record changing levers within the interior of the spindle, a cam surface on each of said record changing levers to pivot said changing levers about said retaining ring means, an operating rod slidably disposed inside said record spindle, said operating rod having a camming surface for engagement with the cam surfaces on said changing levers, said operating rod and said ring retaining means holding said record changing levers within the interior of said shaft while allowing said record changing levers to retract said record supporting surfaces from under the lowermost record whereby said record is released, and to radially move said record holding surfaces into holding engagement with the center hole of the record above the lowermost record.

16. In an automatic record changer having a turntable for playing records, a straight tube magazine spindle having a plurality of longitudinal slots in said tube, a plurality of record changing levers, each of said record changing levers positioned within a slot and being movable between an operative record supporting position for supporting the lowermost record of a stack of records to a holding position for holding the record thereabove and the remaining records against downward movement while permitting said lowermost record to descend along the straight spindle to the turntable, each of said record changing levers having a holding surface for wedging against the side wall of the interior hole of the record above the lowermost record, a retaining ring means for holding said record changing levers within the interior of the magazine spindle, a cam surface on each of said record changing levers to pivot said changing levers about said retaining ring means, an operating rod slidably disposed inside said record spindle, said operating rod having a camming surface for engagement with the cam surfaces on said changing levers, said operating rod and said ring retaining means holding said record changing levers within the interior of said shaft while allowing said record changing levers to retract said record supporting surfaces from under the lowermost record whereby said record is released, and to move radially said record holding surfaces into holding engagement with the center hole of the record above the lowermost record.

17. In an automatic record changer having a turntable for playing a stack of records, a straight tube magazine spindle having a plurality of longitudinal slots in said tube, a plurality of record changing levers, each of said record changing levers positioned within a slot and being movable between an operative record supporting position for supporting the lowermost record of a stack of records to a holding position for holding the record thereabove and the remaining records against downward movement while permitting said lowermost record to descend along the straight spindle to the turntable, each of said record changing levers having a rigid body and a holding surface for moving into wedging engagement with the interior hole of the record above the lowermost record, a retaining ring means for holding said record changing levers within the interior of the magazine spindle, said retaining ring means being disposed in a groove on the outer surface of the spindle, a cam surface on each of said record changing levers to pivot said changing levers about said retaining ring means, an operating rod slidably disposed inside said record spindle, said operating rod slidably disposed inside said record spindle, said operating rod having a camming surface for engagement with the cam surfaces on said changing levers, said operating rod and said ring retaining means holding said record changing levers within the interior of said shaft while allowing said record changing levers to retract said record supporting surfaces from under the lowermost record whereby said record is released, and to radially move said record holding surfaces into holding engagement with the center hole of the record above the lowermost record, said record supporting levers holding said operating rod against further upward movement while holding a stack of records, and a switch means operable by said operating rod when said record supporting levers move because of release of the last record of the stack.

References Cited by the Examiner

FOREIGN PATENTS

| | | |
|---|---|---|
| 1,127,610 | 4/62 | Germany. |
| 874,377 | 8/61 | Great Britain. |

NORTON ANSHER, *Primary Examiner.*

EMIL G. ANDERSON, *Examiner.*